United States Patent
Kim et al.

(10) Patent No.: US 8,655,870 B2
(45) Date of Patent: Feb. 18, 2014

(54) APPARATUS AND METHOD FOR RETRIEVING DATA AT HIGH SPEED TO PERFORM POST-PROCESSING ON SATELLITE TELEMETRY DATA

(75) Inventors: In Jun Kim, Daejeon (KR); Byoung Sun Lee, Daejeon (KR); Jae Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/589,332

(22) Filed: Aug. 20, 2012

(65) Prior Publication Data
US 2013/0091124 A1 Apr. 11, 2013

(30) Foreign Application Priority Data
Oct. 7, 2011 (KR) .......... 10-2011-0102317

(51) Int. Cl.
*G06F 17/30* (2006.01)
(52) U.S. Cl.
USPC ........................................... 707/722
(58) Field of Classification Search
USPC ............... 707/2, 3, 722; 709/224; 714/18; 370/509
See application file for complete search history.

(56) References Cited

U.S. PATENT DOCUMENTS

| | | | |
|---|---|---|---|
| 6,052,588 A | 4/2000 | Mo et al. | |
| 6,381,709 B1 * | 4/2002 | Casagrande et al. | 714/18 |
| 7,778,496 B2 | 8/2010 | Kim et al. | |
| 2006/0227813 A1 * | 10/2006 | Mavrogeanes | 370/509 |
| 2010/0306373 A1 * | 12/2010 | Wormley | 709/224 |

FOREIGN PATENT DOCUMENTS

KR 100669908 B1 1/2007

* cited by examiner

*Primary Examiner* — Etienne Leroux
(74) *Attorney, Agent, or Firm* — William Park & Associates Patent Ltd.

(57) ABSTRACT

A telemetry data retrieval apparatus and method for post-processing are provided. The telemetry data retrieval apparatus may include a retrieval initiating unit to receive an input of a retrieval time, and to calculate a percentage of the retrieval time during an entire retrieval period, a start position calculating unit to calculate a retrieval start position in which data retrieval is started within a stored file, based on the calculated percentage, and a telemetry data retrieval unit to verify a start pattern and a time tag from the calculated retrieval start position, and to retrieve a position of telemetry data in the stored file.

9 Claims, 7 Drawing Sheets

APPARATUS AND METHOD FOR RETRIEVING DATA AT HIGH SPEED TO PERFORM POST-PROCESSING ON SATELLITE TELEMETRY DATA

CROSS-REFERENCE TO RELATED APPLICATION

This application claims the benefit of Korean Patent Application No. 10-2011-0102317, filed on Oct. 7, 2011, in the Korean Intellectual Property Office, the disclosure of which is incorporated herein by reference.

BACKGROUND

1. Field of the Invention

The present invention relates to a data retrieval method for quickly acquire telemetry data required for analysis from all stored telemetry source data, to analyze, through post-processing, telemetry data that is received from a satellite and that is stored in a storage device, in a satellite control system.

2. Description of the Related Art

In a satellite control system, telemetry data transmitted from a satellite may be processed in real time, and may be displayed using various display functions.

The satellite control system may store the received telemetry data in a separate storage device, apart from displaying the telemetry data using display functions. The stored telemetry data may be used in post-processing, to replay telemetry data that was received in a specific time, or to extract a value of telemetry data, or to analyze a trend of a change in a value of telemetry data.

The received telemetry data may typically be stored in a database, or telemetry source data may be stored in the form of an electronic file without a change.

To retrieve an electronic file in which telemetry data is stored, a scheme of reading and comparing time-tag information from a beginning of a stored file, and of retrieving desired data may be used, or a scheme of generating data for a separate retrieval and using the data to perform the retrieval. The scheme of retrieving data from the beginning of the stored file is disadvantageous in that a large amount of time is required for the retrieval when the desired data is included in a rear side of the electronic file. Additionally, the scheme of generating data for a separate retrieval and using the data to perform the retrieval may have a burden of managing the data.

SUMMARY

According to an aspect of the present invention, there is provided a telemetry data retrieval apparatus for post-processing, including a retrieval initiating unit to receive an input of a retrieval time, and to calculate a percentage of the retrieval time during an entire retrieval period, a start position calculating unit to calculate a retrieval start position in which data retrieval is started within a stored file, based on the calculated percentage, and a telemetry data retrieval unit to verify a start pattern and a time tag from the calculated retrieval start position, and to retrieve a position of telemetry data in the stored file.

According to another aspect of the present invention, there is provided a telemetry data retrieval method for post-processing, including receiving, by a retrieval initiating unit, an input of a retrieval time, and calculating a percentage of the retrieval time during an entire retrieval period, calculating, by a start position calculating unit, a retrieval start position in which data retrieval is started within a stored file, based on the calculated percentage, and verifying, by a telemetry data retrieval unit, a start pattern and a time tag from the calculated retrieval start position, and retrieving a position of telemetry data in the stored file.

EFFECT

According to embodiments of the present invention, it is possible to quickly retrieve telemetry source data to be used for post-processing.

Additionally, according to embodiments of the present invention, it is possible to quickly retrieve telemetry data of a time interval that a user desires to analyze through post-processing, from telemetry source data of a satellite that is stored in the form of an electronic file.

Furthermore, according to embodiments of the present invention, it is possible to quickly and conveniently analyze telemetry data using a satellite control system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
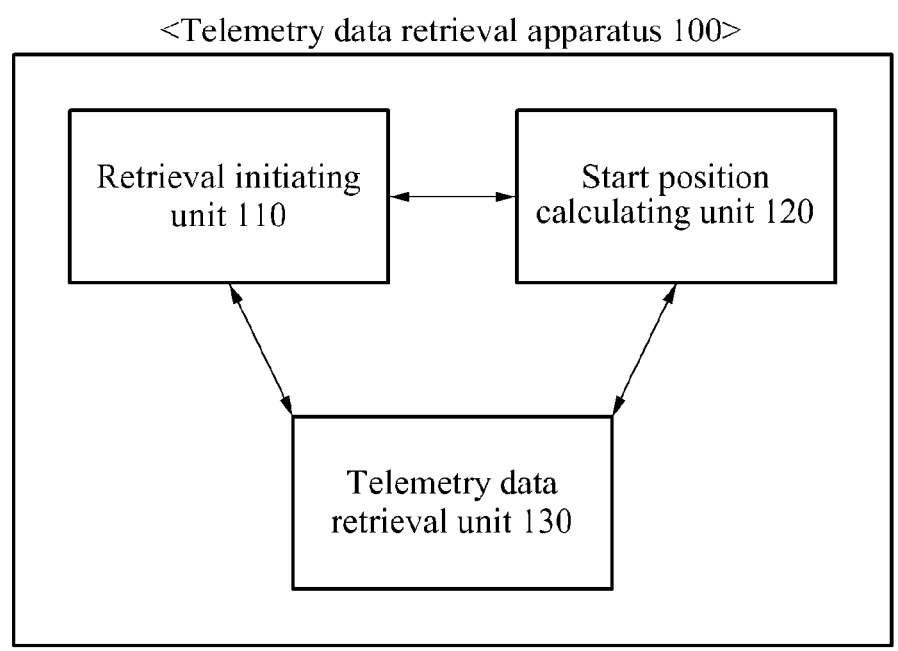
FIG. 1 is a block diagram illustrating a telemetry data retrieval apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a telemetry data retrieval apparatus 100 according to an embodiment of the present invention.

The telemetry data retrieval apparatus 100 may retrieve telemetry data from a telemetry source data file stored in the form of an electronic file.

An electronic file may be stored in a specific time unit. For example, data may be collected every 24 hours, or every a week, and the collected data may be stored in a single electronic file. A single piece of received telemetry data may include time-tag information, and a satellite control system may record telemetry data in the electronic file every time the telemetry data is received. Accordingly, the telemetry data retrieval apparatus 100 may quickly retrieve data of a time interval that a user desires to analyze using time-tag information.

Referring to FIG. 1, the telemetry data retrieval apparatus 100 may include a retrieval initiating unit 110, a start position calculating unit 120, and a telemetry data retrieval unit 130.

The retrieval initiating unit 110 may receive an input of a retrieval time, and may calculate a percentage of the retrieval time during an entire retrieval period.

The start position calculating unit 120 may calculate a retrieval start position, based on the calculated percentage. Hereinafter, the retrieval start position may refer to a position in which retrieval of telemetry data is started within a stored telemetry data file.

For example, the start position calculating unit 120 may calculate, as the retrieval start position, a portion of the stored file corresponding to the percentage.

In other words, when a data retrieval is started, the start position calculating unit 120 may calculate a percentage or ratio of a retrieval start time during a retrieval period input by a user with respect to a period in which a telemetry data file is stored.

Since the telemetry data file stores telemetry data in a chronological order, a ratio of a retrieval start time to retrieve data with respect to an entire storage period of a single file may be assumed to be identical to a ratio of a size of data to be retrieved with respect to a total size of a telemetry data file. Accordingly, the percentage or the ratio may be calculated.

The start position calculating unit 120 may calculate, as the retrieval start position, a portion of the stored file corresponding to the percentage. In other words, the start position calculating unit 120 may calculate the retrieval start position using the calculated percentage (or ratio).

Accordingly, the start position calculating unit 120 may calculate the retrieval start position using the following Equation 1:

Retrieval start position=File size*Percentage     [Equation 1]

The telemetry data retrieval unit 130 may verify a start pattern and a time tag from the calculated retrieval start position, and may retrieve a position of telemetry data in the stored file.

The telemetry data retrieval unit 130 may retrieve the start pattern, and may verify the time tag based on a position of the retrieved start pattern.

The telemetry data retrieval unit 130 may verify a number of retrievals. When the retrieval is performed once, the telemetry data retrieval unit 130 may compare the retrieval start time with an extracted time tag. When the retrieval is performed twice, the telemetry data retrieval unit 130 may trace the time tag in a chronological order.

When the retrieval start time is identical to the extracted time tag, the telemetry data retrieval unit 130 may control post-processing to be performed from retrieved telemetry data. When the retrieval start time is greater than the extracted time tag, the retrieval initiating unit 110 may recalculate the percentage. When the retrieval start time is less than the extracted time tag, the telemetry data retrieval unit 130 may acquire a time tag of previous telemetry to data immediately before the retrieved telemetry data.

Figure 2:
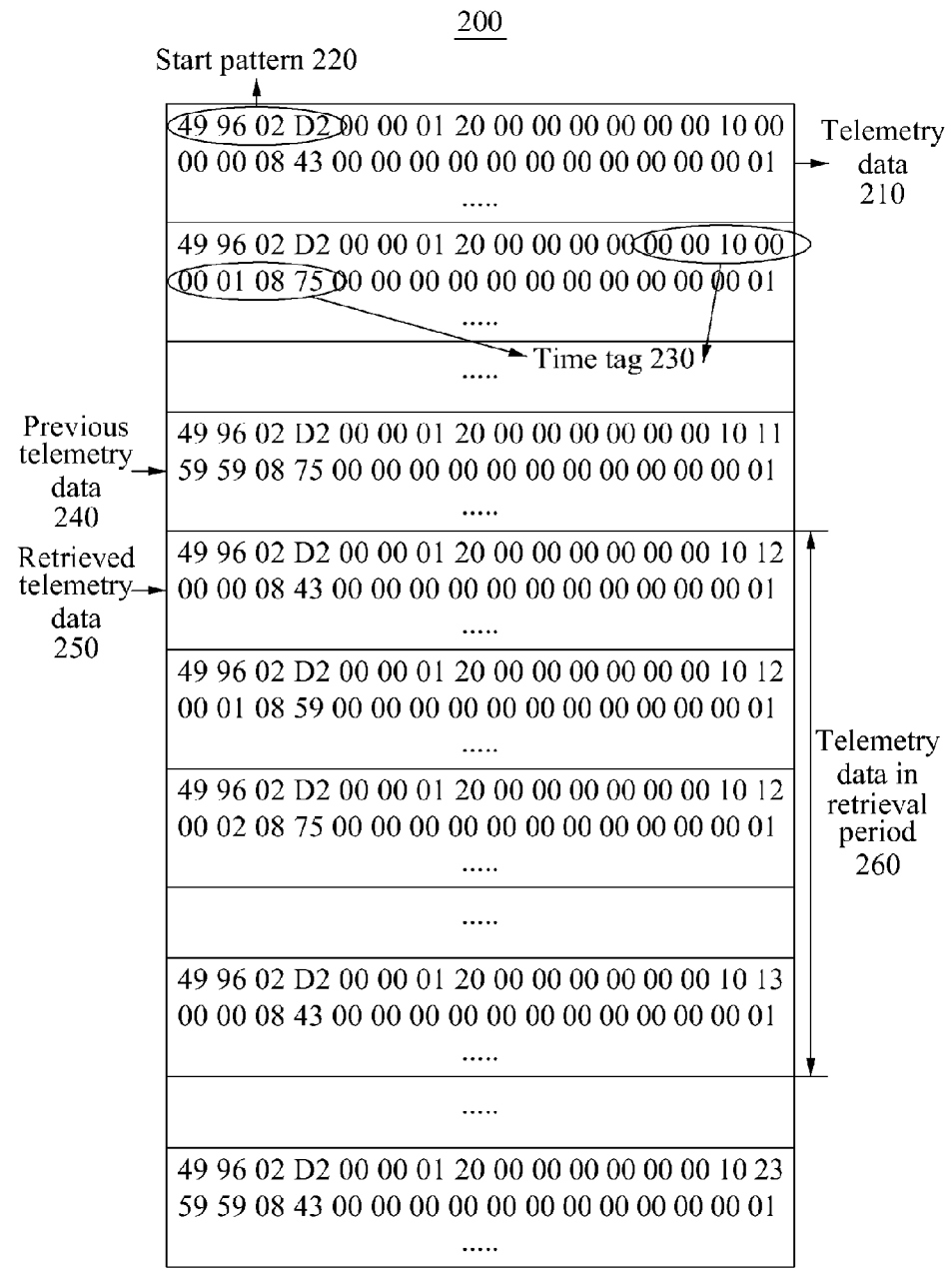
FIG. 2 is a diagram illustrating a data format and a structure of an electronic file in which telemetry data is stored, according to an embodiment of the present invention.

FIG. 2 is a diagram illustrating a data format and a structure of an electronic file 200 in which telemetry data is stored, according to an embodiment of the present invention.

Referring to FIG. 2, the electronic file 200 may be a set of data stored in an order in which telemetry data is received from a satellite. A single piece of telemetry data 210 may include a start pattern 220 and a time tag 230.

The start pattern 220 may indicate a start portion of the telemetry data 210. For example, the telemetry data 210 may be decoded based on the start pattern 220, and each telemetry value may be extracted.

The time tag 230 may indicate a time in which the telemetry data 210 is received. For example, when data desired to be analyzed through post-processing corresponds to a period of time from Jan. 10, 2011, 12:00:00 to Jan. 10, 2011, 13:00:00, telemetry data 260 included in a retrieval period may be post-processed. The telemetry data 210, 240, 250, and 260 may be stored every 1 second in the electronic file 200.

Figure 3:
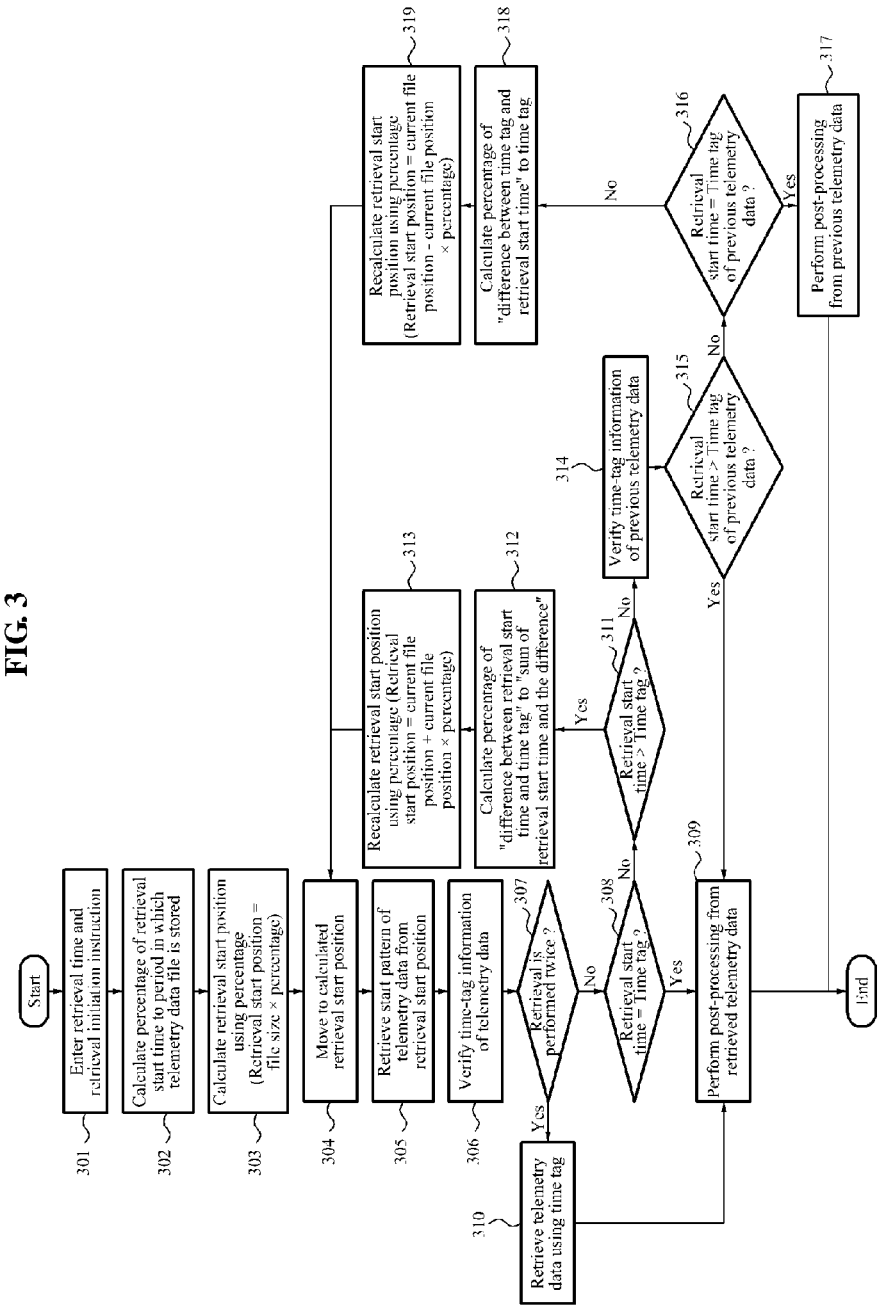
FIG. 3 is a flowchart illustrating a data retrieval method for post-processing of satellite telemetry data according to an embodiment of the present invention.

FIG. 3 is a flowchart illustrating a data retrieval method for post-processing of satellite telemetry data according to an embodiment of the present invention.

In the data retrieval method of FIG. 3, a retrieval initiating unit may receive an input of a retrieval time, and may calculate a percentage of the retrieval time during an entire retrieval period. Additionally, a start position calculating unit may calculate a retrieval start position in which data retrieval is started within a stored file, based on the calculated percentage, and a telemetry data retrieval unit may verify a start pattern and a time tag from the calculated retrieval start position and may retrieve a position of telemetry data.

For convenience of description, a percentage may be used as a value obtained by calculation, and another calculation scheme may be used to refer to a ratio of two values used for calculation.

Referring to FIG. 3, in operation 301, a user enters a retrieval time and a retrieval initiation instruction, in order to perform post-processing of data.

When a data retrieval is started, a percentage (or ratio) of a retrieval start time during a retrieval period input by the user with respect to a period in which a telemetry data file is stored may be calculated in operation 302. Since the telemetry data file stores telemetry data in a chronological order, a ratio of a retrieval start time to retrieve data with respect to an entire storage period of a single file may be assumed to be identical to a ratio of a size of data to be retrieved with respect to a total size of a telemetry data file. Accordingly, the percentage (or ratio) may be calculated.

In operation 303, a retrieval start position may be calculated using the calculated percentage (or ratio).

The retrieval start position may be calculated using Equation 1 (Retrieval start position=File size*Percentage).

When the retrieval start position is calculated, the telemetry data retrieval unit may move to the calculated retrieval start position in operation 304, and may retrieve a start pattern of the telemetry data from the retrieval start position, to retrieve a start portion of the telemetry data in operation 305.

When the start pattern is retrieved, a portion of the telemetry data in which time-tag information is positioned may be extracted based on a position of the start pattern, and may verify the time-tag information in operation 306.

In operation 307, whether retrieval is performed twice may be determined. When the retrieval is determined to be performed once, the retrieval start time may be compared with an extracted time tag. When the retrieval is determined to be performed twice, telemetry data corresponding to the retrieval start time may be retrieved using a traditional method of tracing a time tag in a chronological order and retrieving data in operation 310.

When the retrieval start time is identical to the time tag in operation 308, post-processing may be performed from the retrieved telemetry data in operation 309.

When the retrieval start time is greater than the time tag in operation 311, a percentage for recalculating the retrieval start position may be calculated in operation 312. In operation 312, a percentage of a "difference between the retrieval start time and the time tag" with respect to a "sum of the retrieval start time and the difference" may be calculated.

In operation 313, the retrieval start position may be recalculated using the percentage calculated in operation 312. In this instance, the retrieval start position may be obtained using the following Equation 2:

$$\text{Retrieval start position} = \text{Current file position} + \text{Current file position} * \text{Percentage} \quad \text{[Equation 2]}$$

When the retrieval start time is less than the time tag, time-tag information of previous telemetry data immediately before the retrieved telemetry data may be acquired and verified in operation 314.

When the retrieval start time is greater than a time tag of the previous telemetry data in operation 315, post-processing may be performed from the retrieved telemetry data in operation 309.

In this case, there is no telemetry data having a time tag that is identical to a retrieval start time set by a user, and the retrieval start time is set by the user between a time tag of the retrieved telemetry data and a time tag of the previous telemetry data. When the retrieval start time is identical to the time tag of the previous telemetry data in operation 316, post-processing may be performed from the previous telemetry data in operation 317.

When the retrieval start time is different from the time tag of the previous telemetry data, a percentage of a "difference between the time tag and the retrieval start time" to the time tag may be calculated in operation 318. In operation 319, the retrieval start position may be recalculated using the percentage calculated in operation 318.

In this instance, the retrieval start position may be obtained using the following Equation 3:

$$\text{Retrieval start position} = \text{Current file position} - \text{Current file position} * \text{Percentage} \quad \text{[Equation 3]}$$

Subsequently, the telemetry data retrieval unit may move to the retrieval start position recalculated in operations 313 and 319.

In other words, in the data retrieval method of FIG. 3, the start pattern may be retrieved, and the time tag of the telemetry data may be verified. In this instance, since the retrieval start position of the telemetry data is retrieved by performing the retrieval twice, telemetry data corresponding to the retrieval start time may be retrieved using the time tag in operation 310, and post-processing may be performed.

Figure 4:
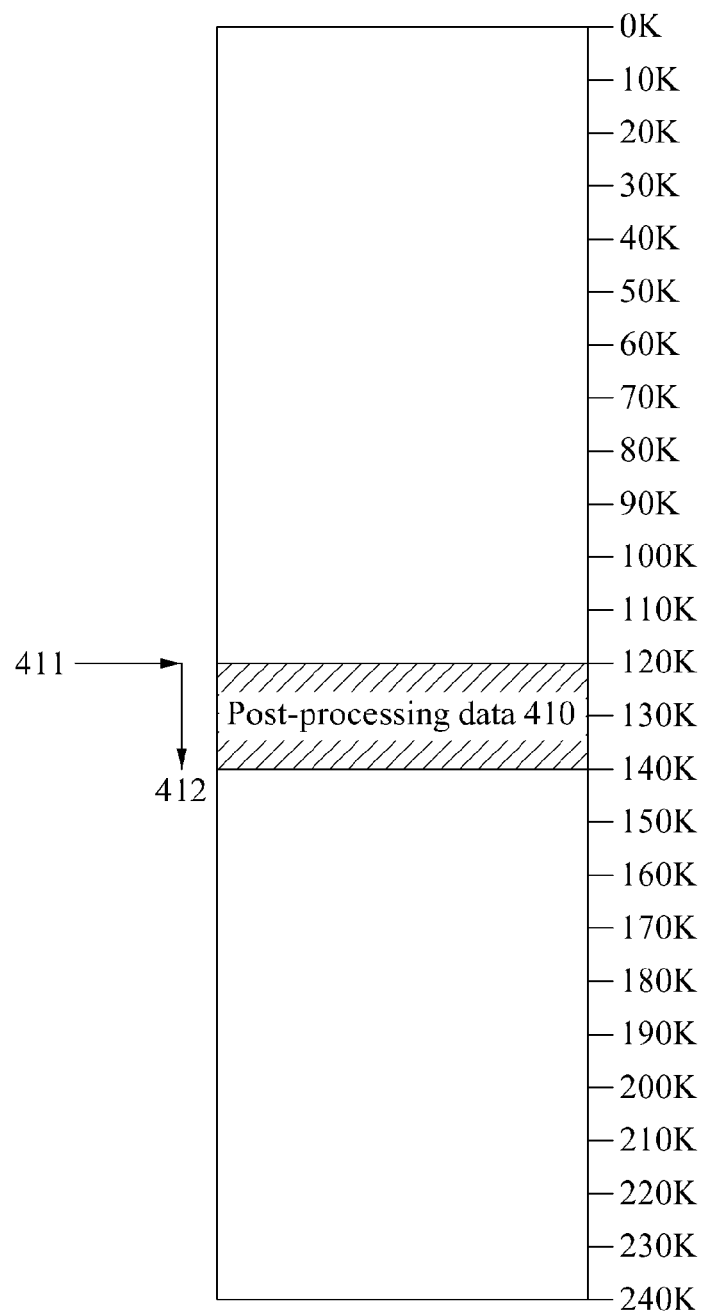
FIG. 4 is a diagram illustrating a process of retrieving an electronic file including telemetry data of a predetermined size in a chronological order, based on a satellite telemetry data retrieval method according to an embodiment of the present invention.

FIG. 4 is a diagram illustrating a process of retrieving an electronic file including telemetry data of a predetermined size in a chronological order, based on a satellite telemetry data retrieval method according to an embodiment of the present invention.

FIG. 4 illustrates an example of retrieving an electronic file 400 including telemetry data of a predetermined size in a chronological order.

A telemetry data file may be assumed to be a file in which data is stored 24 hours a day, and in which the telemetry data of the predetermined size is stored every 1 second. A period from 12:00 to 14:00 may be assumed to be required for post-processing, and data of 10 kilobytes (KB) may be assumed to be stored for 1 hour. In this instance, a retrieval start position of post-processing data 410 to be processed based on the satellite telemetry data retrieval method may be retrieved using the following method:

First, a percentage of a retrieval time may be calculated.

In this instance, the percentage may be calculated as follows:

$$\text{Percentage} = \text{Retrieval start time}/24\text{ hours} = \text{second (12:00:00)}/\text{second (24:00:00)} * 100 = 43200/86400 * 100 = 50\%$$

Subsequently, the retrieval start position may be calculated using the percentage.

In this instance, the retrieval start position may be calculated as follows:

$$\text{Retrieval start position} = \text{File size} * \text{Percentage} = 240 \text{ KB} * 50\% = 120 \text{ KB}$$

Subsequently, time-tag information of telemetry data may be verified, as indicated by reference numeral 411 of FIG. 4.

In this instance, the retrieval start time (12:00:00) may be identical to a time tag (12:00:00).

Subsequently, post-processing may be performed from retrieved telemetry data, as indicated by reference numeral 412 of FIG. 4. In this instance, the post-processing may be performed on data 410 during a period from 12:00 to 14:00.

Figure 5:
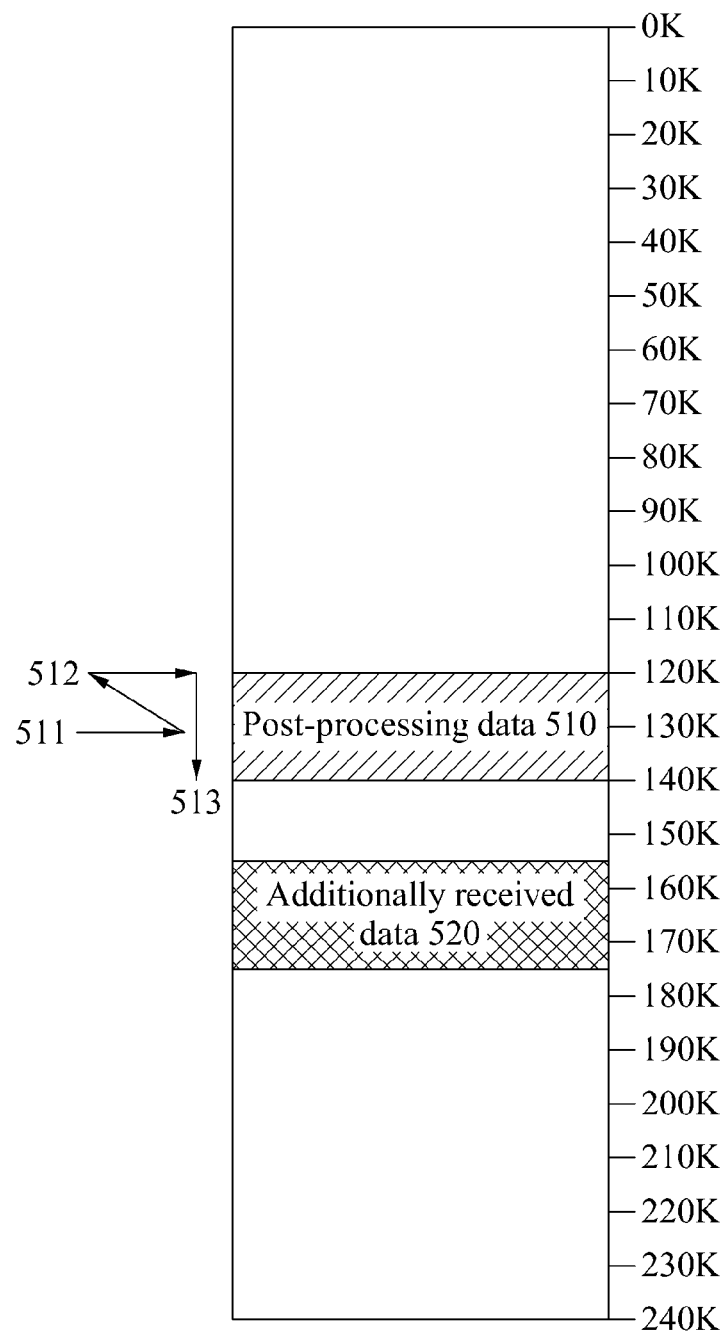
FIG. 5 is a diagram illustrating a process of retrieving an electronic file including additional data after a retrieval time, based on a satellite telemetry data retrieval method according to an embodiment of the present invention.

FIG. 5 is a diagram illustrating a process of retrieving an electronic file including additional data after a retrieval time, based on a satellite telemetry data retrieval method according to an embodiment of the present invention.

For example, when an electronic file 500 of FIG. 5 is assumed to include post-processing data 510 and data 520 that is additionally received from a satellite in response to a user's request after a retrieval time, a retrieval start position of the post-processing data 510 to be processed based on the satellite telemetry data retrieval method may be retrieved using the following method:

A percentage of the retrieval time may be calculated as follows:

$$\text{Percentage} = \text{Retrieval start time}/24\text{ hours} = \text{second (12:00:00)}/\text{second (24:00:00)} * 100 = 43200/86400 * 100 = 50\%$$

Subsequently, the retrieval start position may be calculated using the percentage, as follows:

$$\text{Retrieval start position} = \text{File size} * \text{Percentage} = 260 \text{ KB} * 50\% = 130 \text{ KB}$$

Subsequently, as indicated by reference numeral 511 of FIG. 5, time-tag information of telemetry data may be verified, and time-tag information of previous telemetry data, in which a retrieval start time (12:00:00) is less than a time tag (13:00:00), may be verified.

Retrieval start time (12:00:00) < Time tag of previous telemetry data (12:59:59)

A percentage of a difference between a retrieval start time and a time tag to the time tag may be calculated as follows:

$$\text{Percentage} = (\text{Time tag} - \text{Retrieval start time})/\text{Time tag} = (\text{second}(13:00:00) - \text{second}(12:00:00))/\text{second}(13:00:00) * 100 = 3600/43200 * 100 = 8.3333333\%$$

Subsequently, the retrieval start position may be calculated using the percentage, as follows:

$$\text{Retrieval start position} = \text{Current file position} - \text{Current file position} * \text{Percentage} = 130 \text{ KB} - 130 \text{ KB} * 8.3333333\% = 130 \text{ KB} - 10.8333333 \text{ KB} = 119.1666666 \text{ KB}$$

Subsequently, in the calculated retrieval start position as indicated by reference numeral 512 of FIG. 5, the time-tag information of the telemetry data may be verified, and whether the retrieval start time (12:00:00) is identical to the time tag (12:00:00) may be determined.

As indicated by reference numeral 513 of FIG. 5, post-processing may be performed from the retrieved telemetry data. In other words, post-processing may be performed on data 510 during a period from 12:00 to 14:00.

Figure 6:
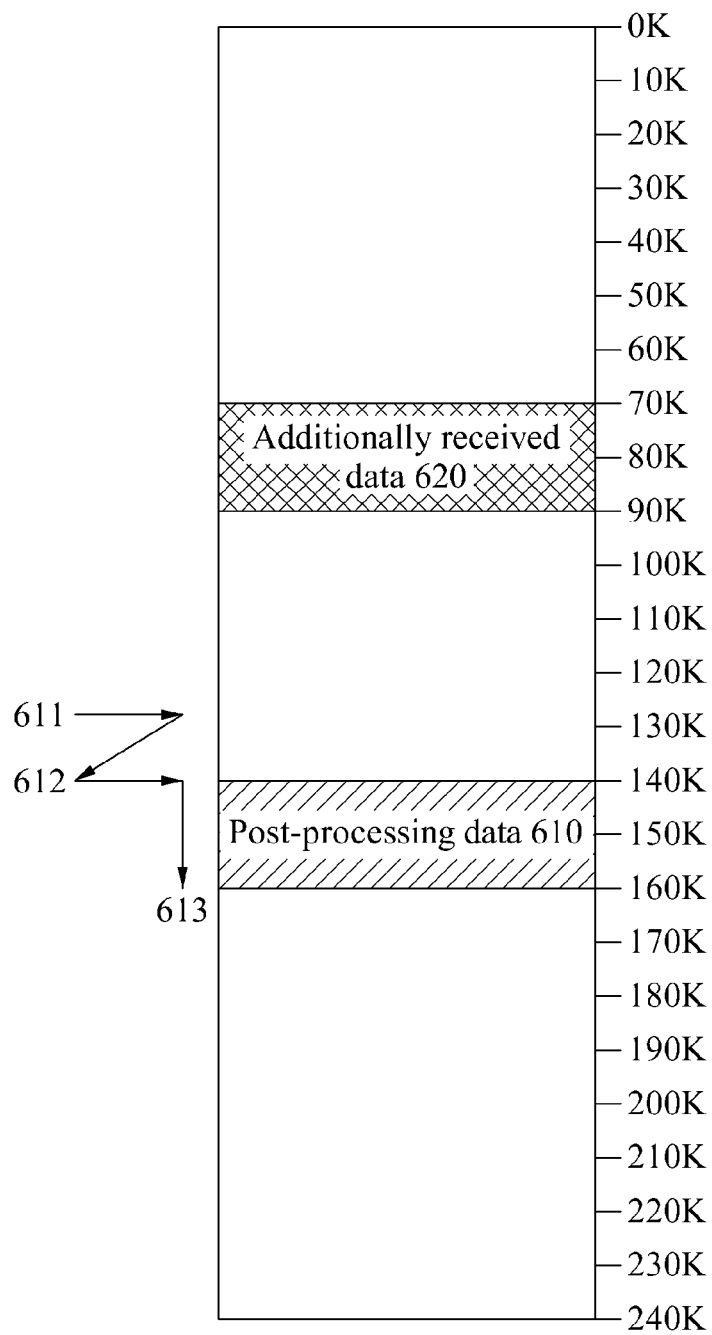
FIG. 6 is a diagram illustrating a process of retrieving an electronic file including additional data before a retrieval time, based on a satellite telemetry data retrieval method according to an embodiment of the present invention.

FIG. 6 is a diagram illustrating a process of retrieving an electronic file including additional data before a retrieval time, based on a satellite telemetry data retrieval method according to an embodiment of the present invention.

For example, when an electronic file 600 of FIG. 6 is assumed to include post-processing data 610 and data 620 that is additionally received from a satellite in response to a user's request before a retrieval time, a retrieval start position of the post-processing data 610 to be processed based on the satellite telemetry data retrieval method may be retrieved using the following method:

A percentage of the retrieval time may be calculated as follows:

$$\text{Percentage} = \text{Retrieval start time}/24 \text{ hours} = \text{second}(12:00:00)/\text{second}(24:00:00)*100 = 43200/86400*100 = 50\%$$

Subsequently, the retrieval start position may be calculated using the percentage, as follows:

$$\text{Retrieval start position} = \text{File size} * \text{Percentage} = 260 \text{ KB} * 50\% = 130 \text{ KB}$$

Subsequently, as indicated by reference numeral 611 of FIG. 6, time-tag information of telemetry data may be verified. In this instance, a retrieval start time (12:00:00) may be greater than a time tag (11:00:00).

A percentage of a difference between the retrieval start time and the time tag with respect to a sum of the retrieval start time and the difference between the retrieval start time and the time tag may be calculated as follows:

$$\text{Percentage} = (\text{Retrieval start time} - \text{Time tag})/(\text{Retrieval start time} + (\text{Retrieval start time} - \text{Time tag})) = (\text{second}(12:00:00) - \text{second}(11:00:00))/(\text{second}(12:00:00) + (\text{second}(12:00:00) - \text{second}(11:00:00)))*100 = 3600/(39600+3600)*100 = 8.3333333\%$$

Subsequently, the retrieval start position may be calculated using the percentage, as follows:

$$\text{Retrieval start position} = \text{Current file position} + \text{Current file position} * \text{Percentage} = 130 \text{ KB} + 130 \text{ KB} * 8.3333333\% = 130 \text{ KB} + 10.8333333 \text{ KB} = 140.83333333 \text{ KB}$$

Subsequently, in the calculated retrieval start position as indicated by reference numeral 612 of FIG. 6, the time-tag information of the telemetry data may be verified, and whether the retrieval start time (12:00:00) is identical to the time tag (12:00:00) may be determined.

As indicated by reference numeral 613 of FIG. 6, post-processing may be performed on the retrieved telemetry data during a period from 12:00 to 14:00.

Figure 7:
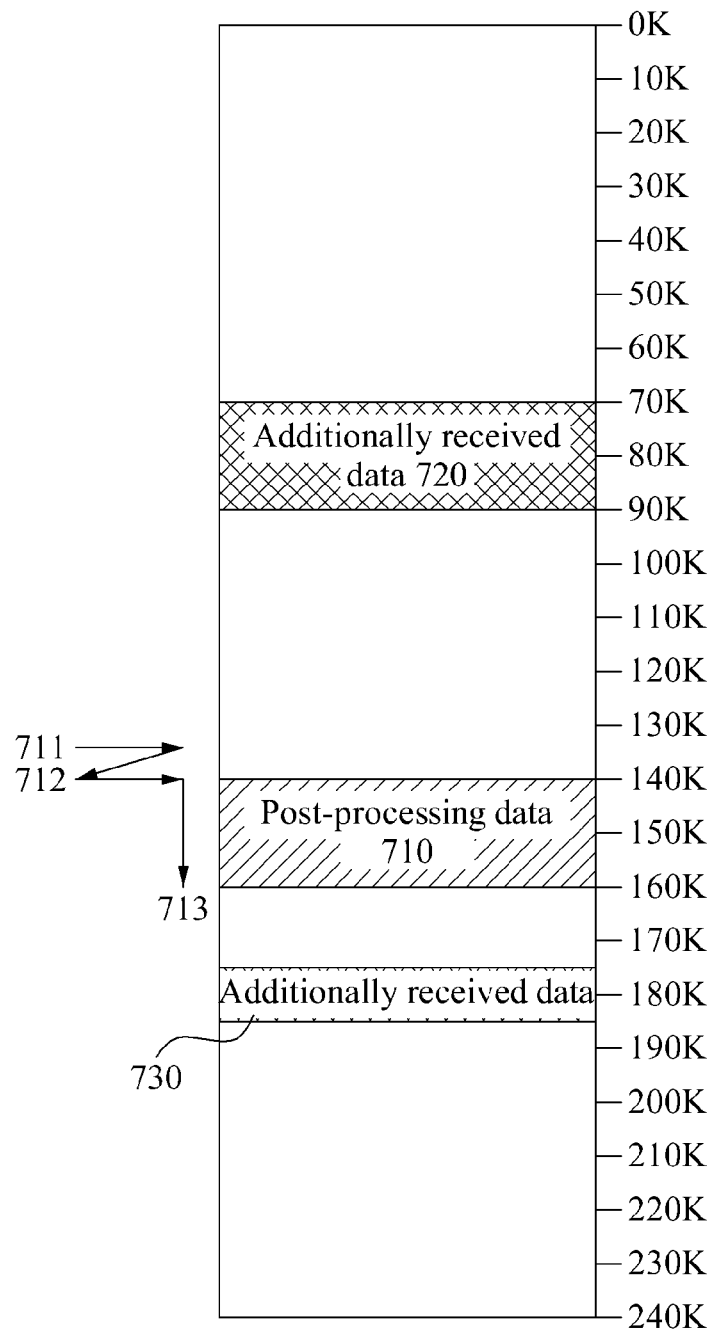
FIG. 7 is a diagram illustrating a process of retrieving an electronic file including additional data with different sizes before and after a retrieval time, based on a satellite telemetry data retrieval method according to an embodiment of the present invention.

FIG. 7 is a diagram illustrating a process of retrieving an electronic file including additional data with different sizes before and after a retrieval time, based on a satellite telemetry data retrieval method according to an embodiment of the present invention.

For example, an electronic file 700 of FIG. 7 may be assumed to include post-processing data 710, and additionally received data 720 and 730. The additionally received data 720 and 730 may be additionally received from a satellite in response to a user's request before and after a retrieval time, respectively. In this instance, a retrieval start position of the post-processing data 710 to be processed based on the satellite telemetry data retrieval method may be retrieved using the following method.

A percentage of the retrieval time may be calculated as follows:

$$\text{Percentage} = \text{Retrieval start time}/24 \text{ hours} = \text{second}(12:00:00)/\text{second}(24:00:00)*100 = 43200/86400*100 = 50\%$$

Subsequently, the retrieval start position may be calculated using the percentage, as follows:

$$\text{Retrieval start position} = \text{File size} * \text{Percentage} = 270 \text{ KB} * 50\% = 135 \text{ KB}$$

Subsequently, as indicated by reference numeral 711 of FIG. 7, time-tag information of telemetry data may be verified, and whether a retrieval start time (12:00:00) is greater than a time tag (11:30:00) may be determined.

A percentage of a difference between the retrieval start time and the time tag with respect to a sum of the retrieval start time and the difference between the retrieval start time and the time tag may be calculated as follows:

$$\text{Percentage} = (\text{Retrieval start time} - \text{Time tag})/(\text{Retrieval start time} + (\text{Retrieval start time} - \text{Time tag})) = (\text{second}(12:00:00) - \text{second}(11:30:00))/(\text{second}(12:00:00) + (\text{second}(12:00:00) - \text{second}(11:30:00)))*100 = 1800/(39600+1800)*100 = 4.3478261\%$$

Subsequently, the retrieval start position may be calculated using the percentage, as follows:

$$\text{Retrieval start position} = \text{Current file position} + \text{Current file position} * \text{Percentage} = 135 \text{ KB} + 135 \text{ KB} * 4.3478261\% = 135 \text{ KB} + 5.869565235 \text{ KB} = 140.869565235 \text{ KB}$$

Subsequently, in the calculated retrieval start position as indicated by reference numeral 712 of FIG. 7, the time-tag information of the telemetry data may be verified, and whether the retrieval start time (12:00:00) is identical to the time tag (12:00:00) may be determined.

As indicated by reference numeral 713 of FIG. 7, post-processing may be performed on the retrieved telemetry data during a period from 12:00 to 14:00.

As described above, according to embodiments of the present invention, there is provided a method of quickly retrieving telemetry data to be used for post-processing, using a retrieval time, a time tag of the telemetry data, and a size of a data file and thus, it is possible to quickly retrieve telemetry data using a satellite control system.

Additionally, according to embodiments of the present invention, it is possible to quickly access a position of desired data by only performing retrieval about twice. In addition, it is possible to retrieve desired telemetry data based on a small number of retrievals through a retrieval of a start pattern and a comparison of a time tag, after searching for a retrieval error caused by an error in a numerical operation.

Furthermore, according to embodiments of the present invention, a configuration of a system may be simplified without a need to manage separate information for retrieval.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the to like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A telemetry data retrieval apparatus for post-processing, comprising: a retrieval initiating unit to receive an input of a retrieval time, and to calculate a percentage of the retrieval time based on an entire retrieval period;
    a start position calculating unit to calculate a retrieval start position in which data retrieval is started within a stored file, based on the calculated percentage; and
    a telemetry data retrieval unit to verify a start pattern and a time tag from the calculated retrieval start position, and to retrieve a position of telemetry data in the stored file.

2. The telemetry data retrieval apparatus of claim 1, wherein the start position calculating unit calculates, as the retrieval start position, a portion of the stored file corresponding to the percentage.

3. The telemetry data retrieval apparatus of claim 1, wherein the telemetry data retrieval unit retrieves the start pattern, and verifies the time tag based on a position of the retrieved start pattern.

4. The telemetry data retrieval apparatus of claim 3, wherein the telemetry data retrieval unit verifies a number of retrievals, wherein, when the retrieval is performed once, the telemetry data retrieval unit compares a retrieval start time with an extracted time tag, and
    wherein, when the retrieval is performed twice, the telemetry data retrieval unit traces the time tag in a chronological order.

5. The telemetry data retrieval apparatus of claim 4, wherein, when the retrieval start time is identical to the extracted time tag, the telemetry data retrieval unit controls post-processing to be performed from retrieved telemetry data, wherein, when the retrieval start time is greater than the extracted time tag, the retrieval initiating unit recalculates the percentage; and
    wherein, when the retrieval start time is less than the extracted time tag, the telemetry data retrieval unit acquires a time tag of previous telemetry data immediately before the retrieved telemetry data.

6. A telemetry data retrieval method for post-processing, comprising:
    receiving, by a retrieval initiating unit, an input of a retrieval time, and calculating a percentage of the retrieval time based on an entire retrieval period;
    calculating, by a start position calculating unit, a retrieval start position in which data retrieval is started within a stored file, based on the calculated percentage; and
    verifying, by a telemetry data retrieval unit, a start pattern and a time tag from the calculated retrieval start position, and retrieving a position of telemetry data in the stored file.

7. The telemetry data retrieval method of claim 6, wherein the calculating comprises calculating, as the retrieval start position, a portion of the stored file corresponding to the percentage.

8. The telemetry data retrieval method of claim 6, wherein the verifying comprises retrieving the start pattern, and verifying the time tag based on a position of the retrieved start pattern.

9. The telemetry data retrieval method of claim 8, wherein the verifying comprises:
    verifying a number of retrievals;
    comparing a retrieval start time with an extracted time tag, when the retrieval is performed once; and
    tracing the time tag in a chronological order, when the retrieval is performed twice.

* * * * *